United States Patent [19]

Shiotani et al.

[11] Patent Number: 4,988,104
[45] Date of Patent: Jan. 29, 1991

[54] GOLF CLUB HEAD AND PROCESS FOR ITS FABRICATION

[75] Inventors: Tadahiko Shiotani; I. Watanabe, both of Nagoya, Japan

[73] Assignee: Kunimori-Kagaku Co., Ltd., Japan

[21] Appl. No.: 401,972

[22] Filed: Sep. 1, 1989

[30] Foreign Application Priority Data

Apr. 3, 1989 [JP] Japan .................. 1-39513[U]
Apr. 24, 1989 [JP] Japan .................. 1-103636

[51] Int. Cl.⁵ ............................................. A63B 53/04
[52] U.S. Cl. .......................... 273/167 H; 273/169; 273/78; 273/DIG. 7; 273/DIG. 23; 273/80.2
[58] Field of Search ................. 273/167-175, 273/80.2-80.9, 80 R, 77 R; 264/263, 46.4, 46.7, 259, 279

[56] References Cited

U.S. PATENT DOCUMENTS 1,538,312  5/1925  Beat ....................... 273/171
1,559,299  10/1925  Barach .................. 273/80.7
4,351,786  9/1982  Mueller ............... 273/72 R X
4,697,814  10/1987  Yamada ................ 273/169

FOREIGN PATENT DOCUMENTS 63-5767  1/1988  Japan ................... 273/167 R

Primary Examiner—Edward M. Coven
Assistant Examiner—Sebastiano Passaniti
Attorney, Agent, or Firm—Ostrolenk, Faber, Gerb & Soffen

[57] ABSTRACT

A golf club head includes a frame having a plurality of hollow axial members extending from the front side to the rear side, and a hosel part is integrally formed with the frame. A foam resin core is deposited around the frame. A face plate is disposed at the front side of the frame. A synthetic resin covering is applied over the frame and over the core by installing the assembly of the frame and core in a mold and pouring in the synthetic resin material at a low pressure so as not to deform or shift the frame or the core and the synthetic resin fills the gaps among the frame, the core and the face plate.

11 Claims, 4 Drawing Sheets

GOLF CLUB HEAD AND PROCESS FOR ITS FABRICATION

BACKGROUND OF THE INVENTION

The present invention relates to the club head of a golf club, particularly a golf club normally called a wood, and more specifically relates to a club head which accommodates a frame in which the club shaft is installed integrally, wherein the frame is coated with a synthetic resin material which surrounds a foam resin core that is disposed over the frame, and the invention relates to a process for fabrics of that club head.

The club head of a golf club may be comprised of a composite resin material It comprises a frame including a hosel part where the shaft is installed. It has an axial part extending from the face or striking side of the club head to the back side. A foam resin core material is applied over the outer periphery of the frame. A composite resin layer, which is formed to a prescribed thickness, covers the outer periphery of the foam resin core material.

The known club head is assembled as follows. Subsequent to the installation of a foam resin core on the frame, another composite resin layer, which covers the outer peripheral surface of the foam resin core, is thermally hardened by a heating and compressive forming method.

The above described golf club head has superior features, including its sweet spot and its light weight, because its major portions are formed from a synthetic resin. Nevertheless, it has not offered the golfer a satisfactory striking sensation, that is, it has not offered the sensation that can be obtained from a club head made of wood. According to the known manufacturing method, moreover, the hardening of the composite resin layer on the outer peripheral surface of the foam resin core by the heating and compressive forming method deforms the foam resin core unevenly as a result of the heating, and this dislocates the frame inside the core. This makes the thickness of the composite resin layer uneven, thereby giving the club head an uneven weight distribution without fixing its center of gravity.

In addition, gaps tend to be produced between the frame and the foam resin core and between that core and the surrounding composite resin layer When a golf ball is hit, the club head produces a strange sound because of the gaps.

SUMMARY OF THE INVENTION

An object of the present invention is to correct the defects described above. The object of the invention is to provide a golf club which is capable of producing a striking sound that is similar to the sound produced by a club head made of wood, and which has a wide sweet spot and affords a high directional character.

Another object of the invention is to provide a process for the fabrication of a golf club head, which is capable of preventing the formation of gaps between the inner members in the club head and which is also capable of making the weight distribution over the club head as uniform as desired and which predictably stabilizes the center of gravity, while preventing the deformation of the foam resin core material and the displacement of the club head frame during fabrication of the club head.

The club head of the invention has a synthetic resin frame which includes an integrally formed hosel part where the club shaft is installed and a multiple pipe shaped installation part passing the center of the club head. A plurality of hollow synthetic resin members are defined at the pipe installation part. Each resin member has an axial line from the face side to the back side of the club head. A foam resin core made of one or more pieces of a synthetic resin foam material with a relatively low specific weight is installed to cover the outer periphery of the hollow members of the installation part. The core is shaped to the external shape of the frame it covers A synthetic resin coating of a material having a specific weight that is higher than that of the foam resin core is applied to coat the outer periphery of foam resin core to a prescribed thickness.

In addition, the invention relates to a process for fabricating a golf club head which is coated with a synthetic resin coating which is disposed over a foam resin core which is, in turn, applied over a synthetic resin frame, the frame having a hosel part where the club shaft is to be installed and having a face plate installed on the face side of the club head. A hollow part of the club head extends from the front side to the back side. To fabricate such a club head, a frame, on which a face plate and a foam resin core have been installed, is placed inside the cavity of a metal mold. A liquid synthetic resin material is poured, either at a low pressure or at normal pressure, into the cavity of the metal mold. The resin material fills the gaps among the face plate, the foam resin core and the frame to from a synthetic resin coating layer of a prescribed thickness.

The club head according to the invention has a generally hollow center because of the presence there of a plurality of hollow axial members. This enables expansion of the sweet spot area of the club head, thereby obtaining a high directional character The striking sound which is produced when the ball is struck resounds inside the hollow axial members. This can produce a satisfactory golf ball striking sound, which is similar to the sound produced when a golf ball is struck by a wooden golf club head.

When a liquid synthetic resin is poured, either under a low pressure or normal resin insertion pressure, into the cavity of the metal mold in which the face plate and the club head frame with a foam resin core had previously been installed, the liquid synthetic resin penetrates and fills the gaps among the frame, the face plate and the foam resin core material and also forms an outer skin. This makes it possible for the synthetic resin coating to have no crevices at all. Because the liquid synthetic resin is poured into the cavity under a low pressure, the foam resin core that had been installed on the frame is prevented from being deformed, making it possible to stabilize the center of gravity of the club head and to distribute its weight evenly.

Other objects, features and advantages of the present invention will become apparent from the following description of the invention which refers to the accompanying drawings.

DETAILED DESCRIPTION OF THE PREFERRED EMBODIMENT

Figure 1:
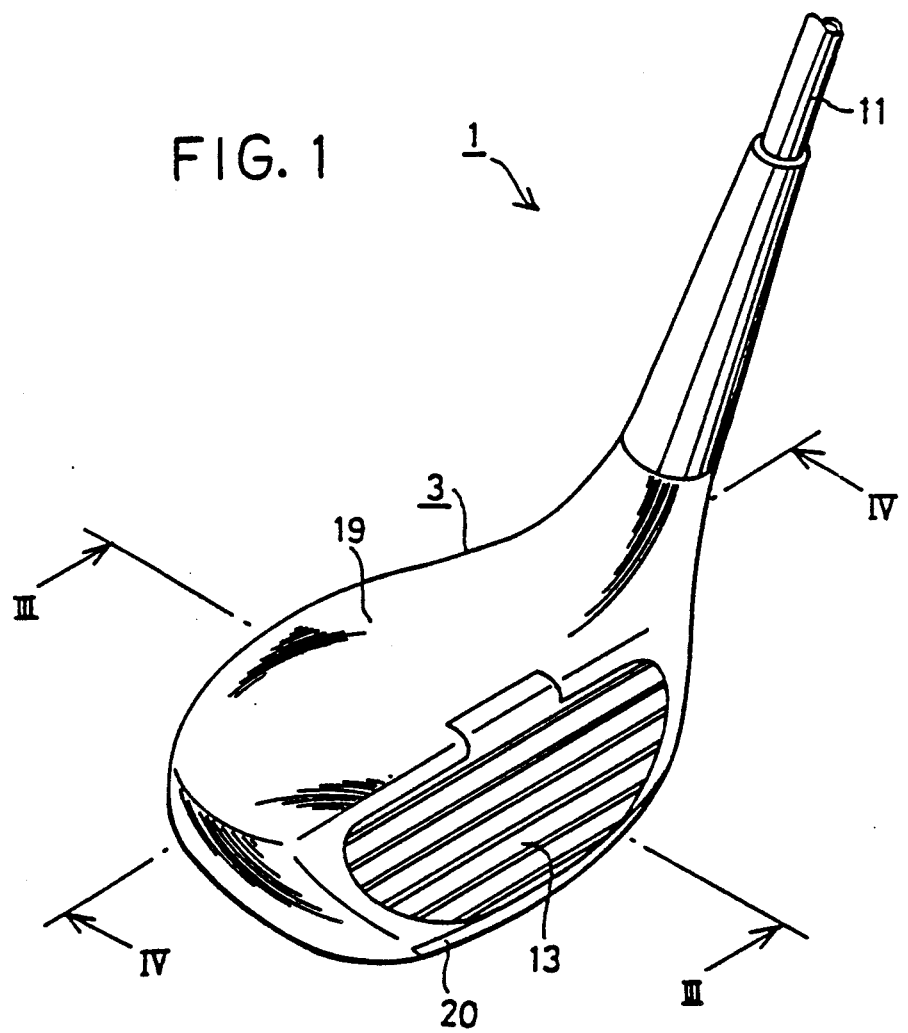
FIG. 1 is an oblique view of a club head of a golf club.
Figure 2:
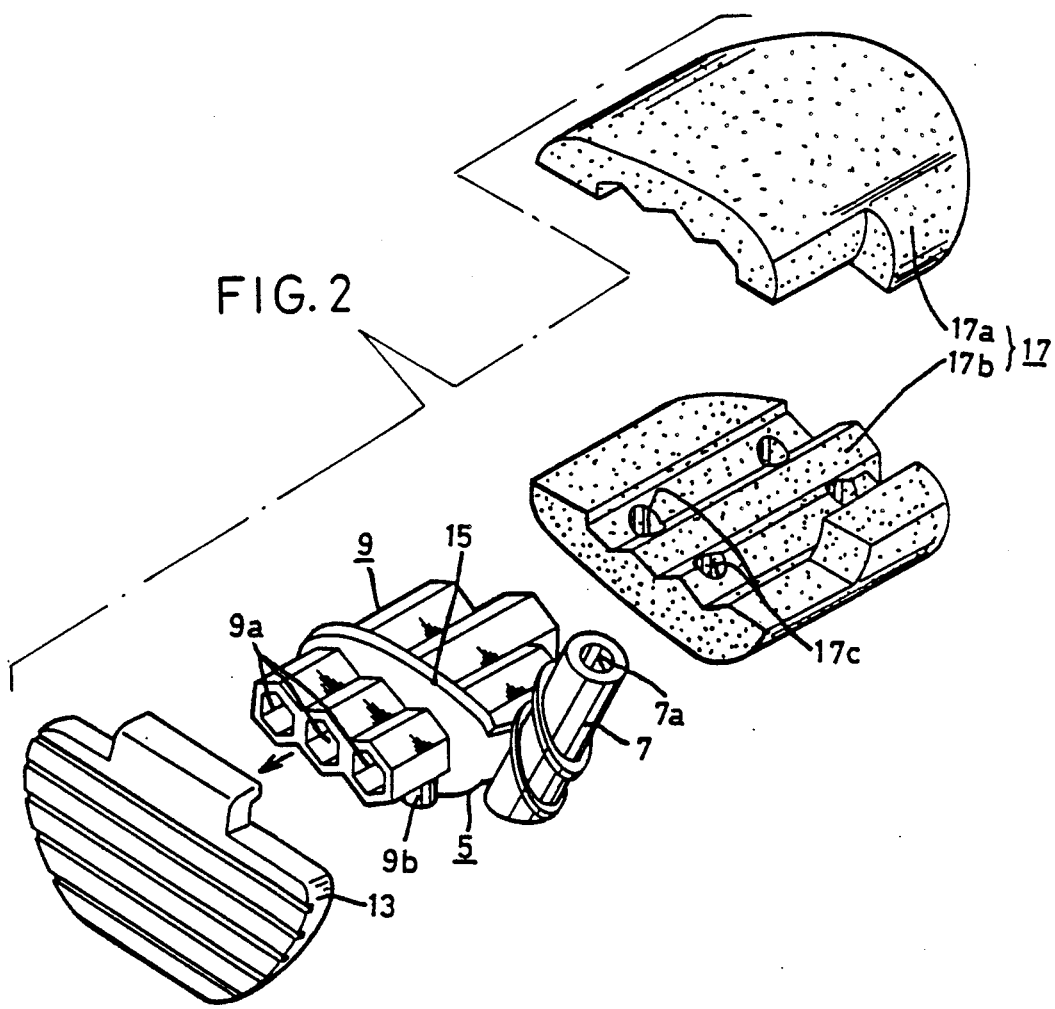
FIG. 2 is a disassembled oblique view of the inner structure of a golf club head according to the invention.
Figure 3:
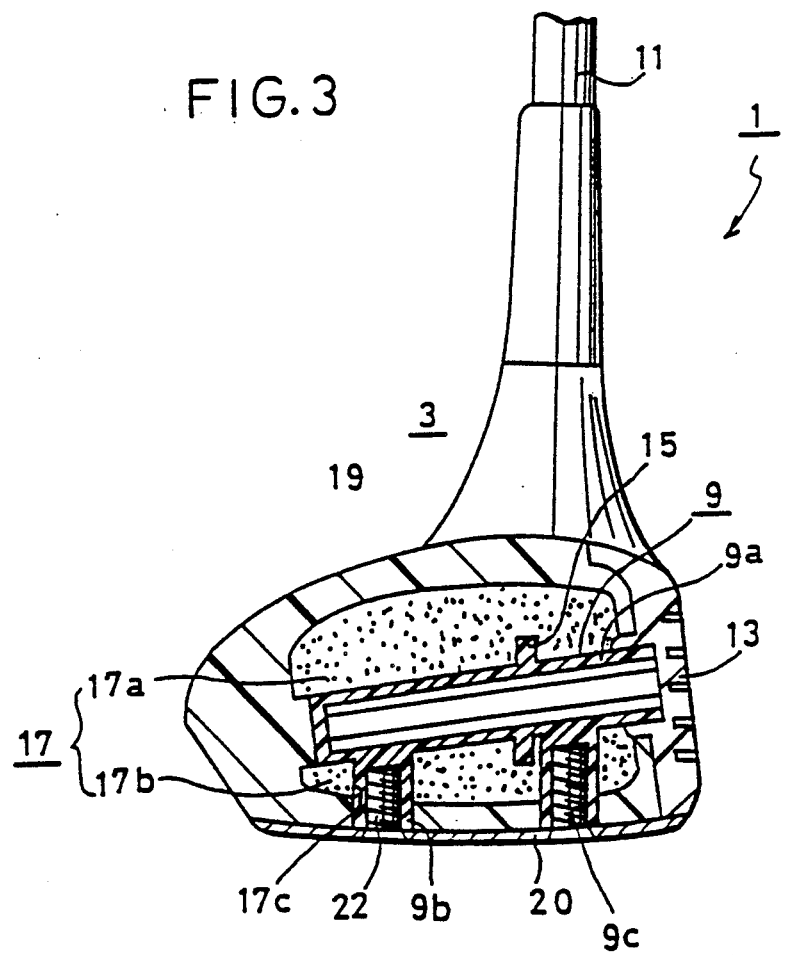
FIG. 3 is a cross-section through the club head in FIG. 1 along line III—III in FIG. 1
Figure 4:
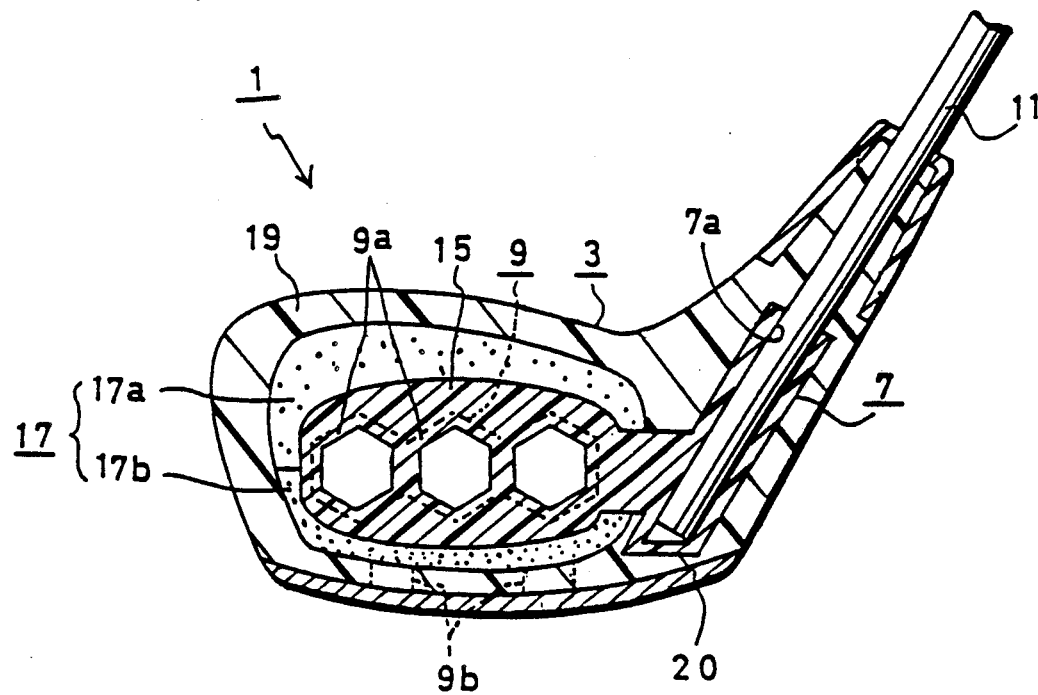
FIG. 4 is a cross-section through the club head in FIG. 1 along line IV—IV in FIG. 1.

A golf club 1 includes a club head 3 and a frame 5 which is accommodated inside the club head. The frame is made of a high hardness resin composite material containing carbon fibers, glass fibers, Whisker fibers or Kebler fibers. The frame includes a hosel part 7. It includes a hollow member 9 which is comprised of a plurality of hollow axial members which are formed integrally at the base side or rear side of the club head and at the opposite face side.

The hosel part 7 is placed in the installation hole 7a. The frame 5 and the shaft 11 are fixed together when the shaft 11 is inserted into and is secured in the installation hole 7a.

The hollow member 9 has an axial line that extends from the face side at the rear portion of the face plate 13 to the back side of the frame. The member 9 is integrally formed so as to be mutually adjacent between the heel side and the toe side. The member 9 is comprised of three hexagonal pipes 9a whose rear ends are closed. The pipes are arrayed parallel, side by side generally in a plane. The hollow member 9 is formed integrally with the hosel part 7 through a rib 15 that extends over the pipes and to the hosel part.

Two bosses 9b are integrally formed at the bottom of each pipe 9a and are situated on the heel side and the toe side of the club head. A screw hole 9c is provided into each boss 9b.

A ball striking face plate 13 of high hardness is either inserted into or is affixed to the front end of the hollow member 9. It is comprised of a composite resin material containing ceramic, metal, or carbon, glass and whisker fibers, etc.

A foam resin core 17 is installed around the outer periphery of the hollow member 9. It extends up to where the face plate 13 was installed. The foam resin core 17 is comprised of foamed polypropylene or foamed urethane, etc of a relatively lower specific weight. Moreover, it is formed in two parts comprising the upper core 17a and the lower core 17b. The inward, opposed surfaces of the upper core 17a and the lower core 17b are shaped to conform to the upper and the bottom surfaces, respectively, of the hollow member 9. Positioning holes 17c are formed in the lower core 17b, each hole 17c to align with a respective boss 9b.

A synthetic resin coating 19 is formed on the outer periphery of the completed unit comprising the frame 5 with the face plate 13 and the foam resin core material 17. The resin is kept out of the hollow axial members 9a The synthetic resin coating 19 comprises a high hardness, thermally hardened polyurethane resin, epoxy resin or synchropentadiene of the catalytic activity type of a relatively higher specific weight than that of the foam material of the core 17. The coating is deposited to a required thickness over the frame 5 which had been coated with the foam resin core 17.

It is possible to effect coating of the synthetic resin coating 19 as a back weight (not shown) which is installed at the rear ends of the pipe or three pipes 9a.

A sole plate 20 made of metal is screwed to the bottom of the formed club head 5. The sole plate 20 is fixed by screws 22 to the bosses 9b.

A golf club head constructed in the above manner has all of the face plate 13, hollow member 9, frame 5 and hosel part 7 formed integrally. This makes it possible to give to a struck ball the rotary moment of the club head 3 that is produced during the swinging of the golf club. This enables the golfer to obtain a high impact force on a ball, and, at the same time, the club head has a high impact resistance.

Since three pipe shaped hollow members 9a are provided on the face side and the back side generally at the center of the club head 3, it is possible to reduce the club head weight at the center of the club head 3 and to expand the sweet spot area n the club head 3, thereby making it possible to obtain a high directional character.

When the club head 3 strikes a ball, moreover, the impact sound resounds inside the hollow member 9, thereby offering a striking sound which is almost the same as the striking sound produced by a wooden club head striking a ball.

Next, the process for the fabrication of a club head having the aforementioned structure is explained.

Figure 5:
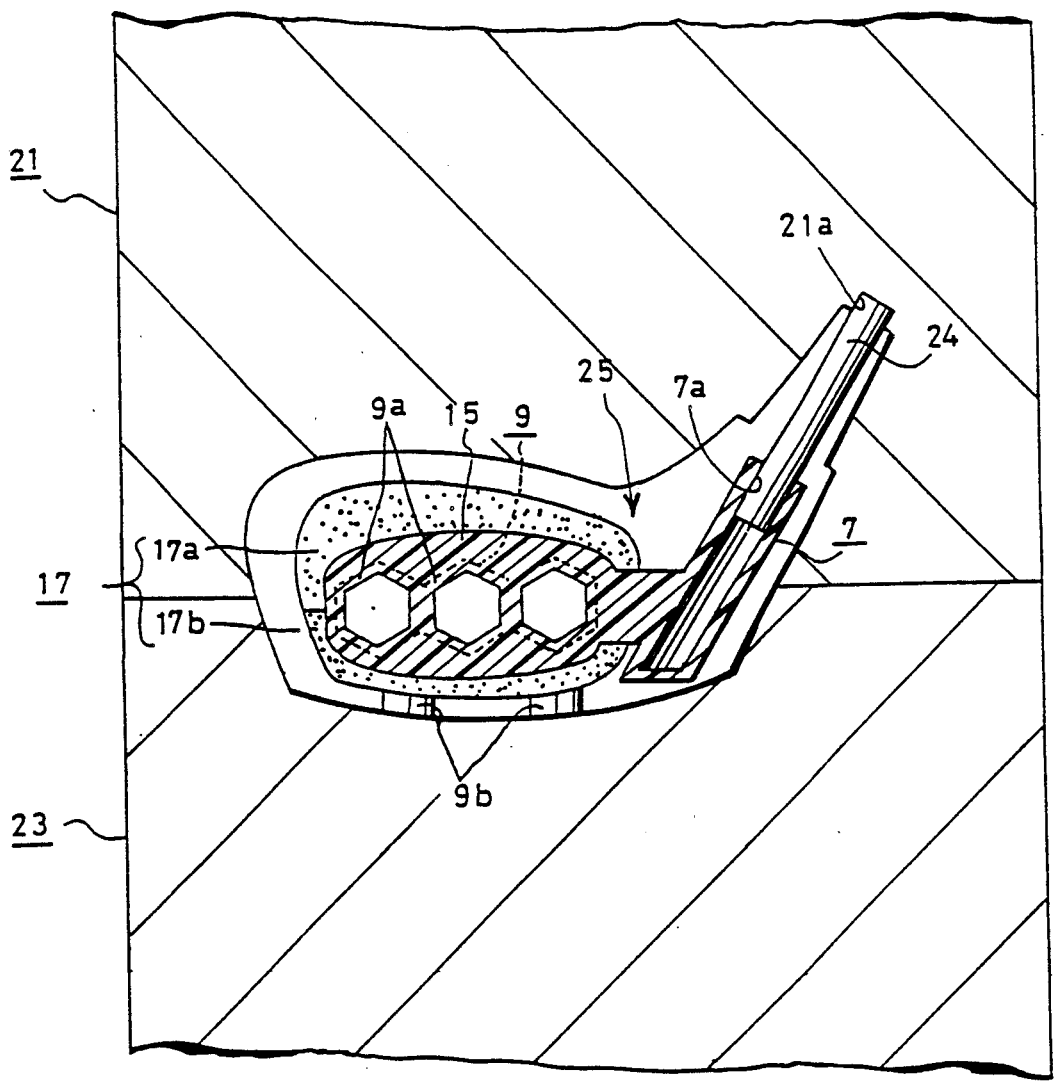
FIG. 5 is a cross-section through a mold used in fabricating a golf club head, shown at the time of molding.

FIG. 5 is a cross-section showing the structure of a metal mold used for molding a club head at the time of molding. The club head frame 5 without a resin coating 19 is installed inside the upper metal mold half 21. An installation axis 24 is inserted into and closes the installation hole 7a on the hosel part and aligns the club head with the installation hole 21a of the upper mold half 21.

The lower metal mold half 23 is clamped beneath the upper metal mold half 21. At that time, positioning of the frames is effected in such a fashion that the lower terminal faces of the bosses 9b and the face plate 13 may be located on the upper mold surface of the lower metal mold half 23.

The foam resin core 17, comprised of pieces of such a material is also installed in the mold in place around the frame 5. The core and the face plate 13 when used close off the ends of the hollow axial members 9a and prevent entry therein of synthetic resin that is poured into the mold cavity.

A liquid synthetic resin for defining the synthetic resin coating 19 is poured into the cavity which is formed by the upper and lower metal mold halves 21 and 23, either in a non-pressurized normal state or in a low pressure state. The term low pressure state according to this invention may be either the non-pressurized state or such a low pressure state that it should prevent deformation or a positioning shift of the frame 5 which is located inside the cavity and should prevent deformation of the foam resin core 17 around the frame.

The liquid synthetic resin material may be a liquid material that is prepared by mixing a main agent and a hardening agent, or a catalyst activation agent in conformity with the desired hardening time. Since the liquid synthetic resin is in a liquid state when it is being poured into the cavity 25, it penetrates and charges into the gaps among the frame 5, the foam resin core 17 and the face plate 13.

Because the liquid synthetic resin is poured, in either a non-pressurized state or under low pressure, as compared with the interior of the cavity 25, the elevated pressure of the injection of the liquid synthetic resin material, as compared with the interior of the cavity 25, does not cause any shift of the position of the frame 5 which is held inside the cavity 25. In addition, hardening of the resin material is promoted at normal temperature because of the heat that is generated in the bridging reaction between the main agent and the hardening agent.

As compared with the interior pressure of the cavity 25, the pouring pressure of the liquid synthetic resin may be based on its own weight or pouring in a comparatively low pressure state in conformity with the regulation of the deformation of the foam resin core 17 at the time of the injection.

During pouring of the liquid synthetic resin, it is also possible to heat the liquid synthetic resin or the metal mold 21 and 23 for promoting the bridging reaction. The upper limit of heating is approximately 120° C. when foam polypropylene is used as the material of the foam resin core and also approximately 120° C. when foam urethane is used as the material of the foam resin core.

After the passage of the required hardening time, hardening of the liquid synthetic resin material is done to a hardness where the shape of the club head 3 is maintained As a result, the synthetic resin coating 19 is applied to an approximately constant thickness over the foam resin core 17 that has been provided on the outer periphery of the frame.

After the prescribed time interval has elapsed, the club head 3 is taken out of the metal mold halves 21 and 23 and is completely hardened in a heated state, producing the final club head.

Next, synthetic resin coats which are used in the process for the preparation of the club head according to this invention are described.

EXAMPLE 1

Kind of the synthetic resin coating material: Two-liquid polyurethane resin
Ratio of the mixture: main agent 40 and hardening agent 60, by weight ratio.
Demolding time one meter 0.65° C.

EXAMPLE 2

Kind of the synthetic resin coating member: Two-liquid epoxy resin.
Ratio of mixture Main agent 50 and hardening agent 50 by weight ratio.
Demolding time: 20 to 60 meters/80° C.

EXAMPLE 3

Kind of the synthetic resin coating material: Synchropentadiene of the catalytic activation type (an example of which is known under the trademark HETTON, a product of Teijin (Company, Limited), and Hercules, Inc.).
Demolding time: From 20 to 30 seconds.

The above described manufacturing process forms a synthetic resin coating 19 by pouring a liquid synthetic resin material into the cavity 25 inside a pair of metal mold halves 21 and 23 in which there is a frame 5, which frame already has installed on it the foam resin core 17. This enables the liquid synthetic resin to penetrate the gaps among the frame 5, the foam resin core material 17 and the face plate 13. This makes it possible to prepare a club head 3 offering a satisfactory striking sensation without having any internal empty regions.

In addition, the liquid synthetic resin is poured into the cavity 25 in a non-pressurized state or under a comparatively low pressure state so as not to deform the foam resin core 17. Molding is carried out to produce a predictable thickness of the synthetic resin coating 19, thus offering a club head 3 whose center of gravity and weight are stabilized.

By shortening the width, in the direction of its axial line, of the foam resin core material 17 that is provided on the outer periphery of the hollow member 9, the weight of the synthetic resin coating 19 covering the outer periphery of the foam resin core material 17 is increased, thereby making the club head 3 heavier.

On the other hand, by increasing the width, in the axial line direction, of the foam resin core material 17 that is provided on the outer periphery of the hollow member 9, the weight of the resin coating 19 is reduced, thereby making the club head 3 lighter.

The weight of the club head 3 can be adjusted by adjusting the width of the foam resin core material 17 in the direction of the axial line Accordingly, a club head 3 can be easily prepared in conformity with a player's wishes.

The frame 5 is formed integrally with the hollow member 9. From the hosel part 7 to the installation part 6, the frame 5 can be integrally formed like ribs, and a plurality of hollow members may be fixed with or inserted into the installation part.

Moreover, the frame 5 is positioned inside the cavity 25 by inserting the installation axis 24, that had previously been inserted into the installation hole 7a of the hosel part, into the installation hole 21a of one of the metal mold halves 21. This positions the lower ends of the bosses 9b and the face plate 13 with respect to the mold surface facing upward. However, the frame 5 may be positioned according to a method wherein the upper end of the installation axis and the installation hole 21a are formed to have different cross-sectional areas respectively, for preventing rotary movement and achieving accurate positioning.

The invention provides a club head of a golf club which is capable of obtaining a satisfactory striking sound, like the striking sound that is obtained by using a club head made of wood and which has a wide sweet spot and a high directional character.

In addition, the invention offers a method for fabricating a golf club and particularly the club head, wherein it is possible to prevent the formation of gaps among the inner members themselves while preventing any possible positioning error of the frame and the deformation of the foam resin core material, thereby making it possible to make the weight distribution and to stabilize its center of gravity.

Although the present invention has been described in relation to particular embodiments thereof, many other variations and modifications will become apparent to those skilled in the art. It is preferred, therefore, that the present invention be limited not by the specific disclosure herein, but only by the appended claims.

What is claimed is:

1. A club head for a golf club, comprising:
 a body having a face side for striking a golf ball and an opposite back side;
 a synthetic resin frame having a front side toward the face side of the club head and a rear side toward the back side of the club head;
 a hollow axial member defined in the frame and extending from the front side toward the rear side of the frame;
 a hosel part on the frame for receiving a golf club shaft;
 a foam material core covering the exterior of the hollow axial member; and a synthetic resin coating around the outer periphery of the core, and defining an enclosure around the frame and the core.

2. The golf club head of claim 1, wherein the core is comprised of foam material of low specific weight, and the synthetic resin coating has a specific weight higher than that of the core.

3. The golf club head of claim 1, wherein the foam core is comprised of a synthetic resin material.

4. The golf club head of claim 3, wherein the foam core is comprised of a plurality of pieces applied over the frame.

5. The golf club head of claim 4, wherein the club head body has a top and a bottom, one core piece is disposed above the axial member toward the top of the body and another core piece is disposed below the axial member toward the bottom of the body.

6. The golf club head of claim 1, wherein there is more than one hollow axial member.

7. The golf club head of claim 6, wherein the hollow axial members are comprised of a synthetic resin material.

8. The golf club head of claim 6, wherein each of the hollow axial members is attached to another hollow axial member, and the hollow axial members extend in a common direction.

9. The golf club head of claim 8, wherein the club head body has a top and a bottom, and the axial members are arrayed next to each other across the golf club head and are located above the bottom and below the top of the golf club head body.

10. The golf club head of claim 8, further comprising a face plate at the front of the frame and affixed to the core.

11. The golf club head of claim 9, wherein the club head has a heel and an opposite toe and the hollow axial members are arrayed side by side and extend generally in the direction from the heel to the toe of the club head.

* * * * *